UNITED STATES PATENT OFFICE

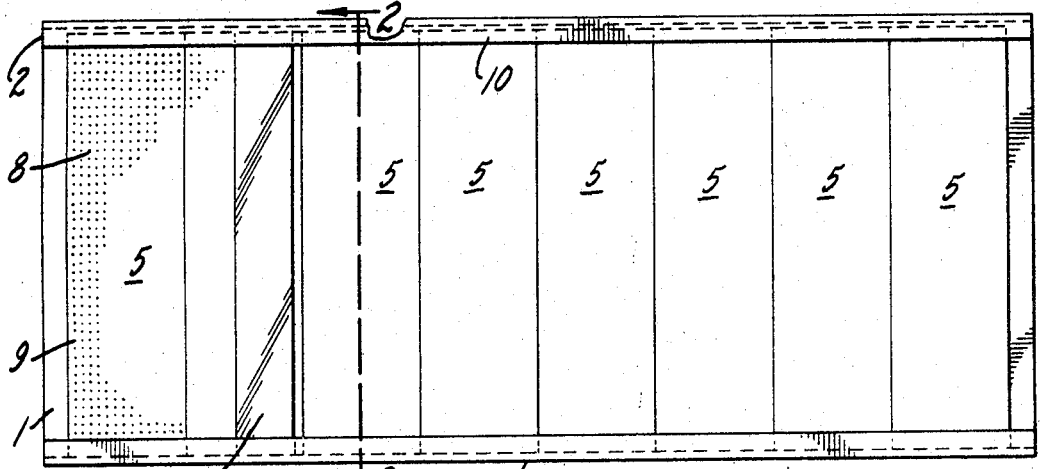
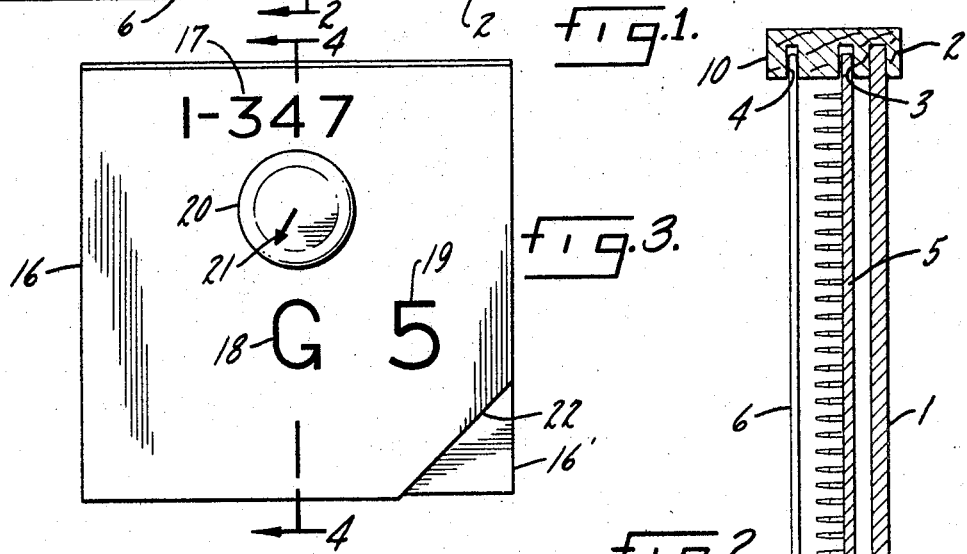
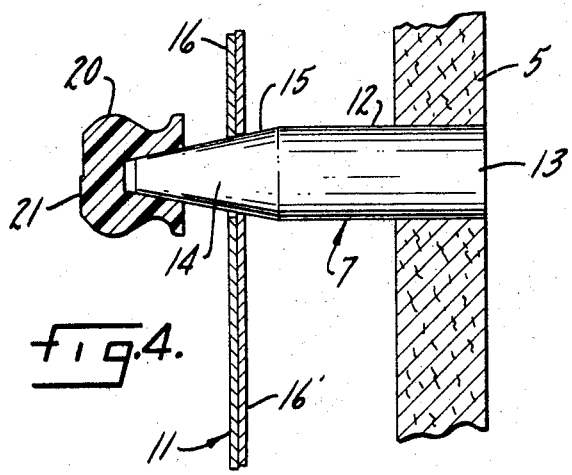

United States Patent Office 3,478,719
Patented Nov. 18, 1969

3,478,719
VISUAL SCHEDULING MEANS
Bernard J. Sadoff, Jr., 3815 Kendale Road,
Annandale, Va. 22003
Filed Apr. 13, 1967, Ser. No. 630,659
Int. Cl. G08b 5/02
U.S. Cl. 116—136
9 Claims

ABSTRACT OF THE DISCLOSURE

Apparatus for scheduling the use of work performing units in which pegs on slidable panels are aligned in vertical rows to represent dates and aligned in horizontal rows to represent the work performing units. Pieces of colored material perforated to receive the pegs represent jobs requiring use of the work performing units. Rotatable caps on the pegs indicate how much time of each work performing unit is taken on each date.

---

This invention relates to means for visibly scheduling work to be performed in the future by a plurality of units.

It is common for a job to require that many different operations must be performed on many different objects by many different work performing means during a future time period. Proper management requires efficient scheduling to ensure optimum use of the work performing units. For example, a machine job shop ordinarily has different kinds of machines such as drills, grinders, cutters, lathes, and the like. At any given time, such a shop will have numerous individual jobs at various stages of completion. Each job will require that numerous separate operations (e.g., drilling, polishing) be performed in a predetermined sequence. Therefore, delay of a single operation can prevent completion of a specific job on time. Also, the efficiency of the entire shop can be lowered by having too many operations of a given type scheduled at the same time (e.g., all of the drills being overloaded). Additional work often could be scheduled if information accurately describing the amount of operating capacity already committed were readily available; for example, rush jobs that would otherwise have to be turned down could be accepted if the effect of squeezing in the rush job on the scheduling of every other job could be readily determined.

Heretofore, visual work scheduling has been attempted by writing in formation in chalk or grease pencil on a large board, or by attaching colored magnets to a metal support. Such arrangements were unsatisfactory, for example, because the information they contain could not be categorized into visually meaningful groupings, nor can the effect of rescheduling some operations on the remaining operations be readily foreseen.

Accordingly, it is an object of my invention to provide visual work scheduling means that eliminates defects of prior art arrangements.

Another object is to provide a work scheduler in which the effect of any change on subsequent operations is immediately visible.

Another object is to provide a work scheduler which shows the number of uncommitted hours on every work performing unit.

Another object is to provide a work scheduler which shows simultaneously the status of numerous different jobs.

Another object is to provide a rugged work scheduler which is relatively inexpensive to operate and maintain.

Another object is to provide a work scheduler which can be operated and understood by relatively unskilled workers.

Other objects and advantages of the invention will be apparent from the specification and drawing, and the scope of the invention will be pointed out in the claims.

Briefly stated, according to one aspect of my invention, operations to be performed in the future by a plurality of work performing units are scheduled on means that visibly (1) identifies each work performing unit, (2) identifies divisions of future time, (3) identifies each job, (4) identifies each operation, and (5) designates how much time of each work performing unit is committed during each such division of future time.

In the drawing:

FIG. 1 is a front view of an embodiment of the invention.

FIG. 2 is a cross-sectional view taken along the line 2—2 in FIG. 1.

FIG. 3 is a front view on an enlarged scale of operation identifying means in accord with my teachings.

FIG. 4 is a cross-sectional view taken along the line 4—4 in FIG. 3.

My invention will now be described with reference to a job shop in which diverse objects are manufactured on various different types of machine. However, my invention is generally applicable to any system where the operation of work performing units must be scheduled, such as office clerical work, vehicle rentals, military movements and combat, or lumberjacking.

FIGS. 1 and 2 show a work scheduler including a rigid panel 1 supporting a pair of identical top and bottom frame members 2. A first pair of open-ended aligned slots 3 and a second pair of open-ended aligned slots 4 in members 2 define pairs of opposed channel means. A plurality of substantially identical panel members 5 are slidably supported in slots 3 and a single transparent panel member 6 is slidably supported in slots 4.

Each panel 5 has a large number of elements such as protrusions 7 on its outer surface. Protrusions 7 are neatly aligned to define horizontal rows 8 and vertical rows 9. Rows 8 on adjacent panels are aligned so as to define continuous horizontal rows extending substantially the full width of the scheduler.

Each vertical row 9 of protrusions 7 represents a predetermined division of a period of time, such as one day, and each panel 5 contains sufficient vertical rows to represent a convenient larger predetermined division of a period of time, such as two weeks. Thus, the scheduler shown in the drawing can represent periods of time up to sixteen weeks in length because it contains eight panels 5. A surface 10 that can be written upon by an erasable marker, such as a grease pencil or chalk, extends across the upper endge of the scheduler, and the date represented by each vertical row 9 is written thereon.

Each horizontal row 8 of protrusions 7 represents a specific work performing unit, such as a drill or any other machine in a job shop. Each such work performing unit is identified by suitable indicia, such as its type and number, written on transparent panel 6 directly in front of its specific row 8. Panel 6 is normally positioned directly to the left of vertical row 9 representing the actual date. However, panel 6 can be moved to a position adjacent any row 9 representing a future date to determine the work scheduled for any machine on such future date.

Turning now to FIGS. 3 and 4, there I have shown the preferred structure for protrusions 7 and means 11 for identifying each specific job to be performed during a predetermined future period of time. Each protrusion 7 comprises a peg 12 having a relatively large end 13 attached to a panel 5 and a relatively small, preferably tapered, end 14. Ends 13 and 14 define abutment means 15 spaced outwardly from the surface of panel 5.

Each job to be scheduled is identified by means 11 comprising pieces 16 of material having one specific predetermined color distinguishable from predetermined different colors respectively identifying every other job on an individual basis. Pieces 16 should be made from a material such as cardboard or plastic that can be written on and the writing erased numerous times. Thus pieces 16 can be reused numerous times before they must be discarded. Information, such as a multi-digit number 17 identifying the job on a master list, a number 18 identifying the operation, and a number 19 identifying the number of hours the operation will take, can be written on each piece 16. Abutment means 15 spaces pieces 16 out from panel 5 a distance sufficient to permit a worker to put his fingers behind pieces 16 and pull all of them on any peg 12 off of such peg 12 at the same time.

When a single job will not take up all of the time that any given work performing unit can be operated during a single day, this information should be indicated visibly to ensure efficient scheduling of such unit. I accomplish this by providing manually movable means such as a removable, rotatable cap 20, made from a suitable material such as rubber or plastic, on end 14 of each peg 12. Suitable indicia, such as an arrow 21, is imprinted on the outer face of each cap 20. Cap 20 is rotated so that arrow 21 occupies a position indicating how much of a normal work day is taken by the jobs identified by the pieces 16 on peg 12; for example, rotation of indicia 21 to a six o'clock position might indicate that six hours have been committed to the jobs represented by pieces 16 and 16', or a six o'clock position might represent that one-half of the normal working day has been committed, depending on the particular code chosen by the user of my scheduler. If overtime is scheduled for a particular work performing unit, this can be indicated by using a cap 20 having a predetermined distinct color.

Several different jobs represented by pieces 16 and 16' can be scheduled for a specific work performing unit on a specific date and this is visibly indicated by placing such pieces on a peg 12 and cutting off a portion at 22 of the outermost piece 16 so that the innermost is visible. If a third piece 16 were placed on peg 12 in FIGS. 3 and 4, a portion could be cut off the two outermost pieces in a different location from 22 so that the third piece would be visible, and so on, when even more pieces are suspended from a single peg 12.

A work scheduler having the structure shown in FIGS. 1–4 used by a machine job shop would operate as follows: Each horizontal row 8 of pegs 12 would represent a specific machine, such as a grinder, or a lathe, or a drill, and each such machine would be identified by a code designation such as a number written on movable panel 6 directly in front of its row 8. Each workday for a sixteen week period of future time would be identified by writing the dates in chronological order over vertical rows 9, and transparent panel 6 would be moved each day so as to be immediately adjacent and to the left of the row 9 designating that day's date. When panel 6 is moved past the last row 9 on the leftmost panel 5, that panel 5 is removed from the scheduler and repositioned at the right end thereof, all remaining panels 5 being slid to the left so that the panel having the closest dates becomes the leftmost panel. Each specific job would be assigned one distinct color. The job number would be written on sufficient pieces 16 of its assigned color to represent each operation to be performed to complete the job. Each such piece 16 with its job number would be placed on a specific peg 12, thus identifying a specific operation to be performed on a specific predetermined date. Obviously, if one operation (e.g., drilling) had to be performed before another (e.g., polishing) this would be scheduled by the chronological order in which pieces 16 were placed on pegs 12 representing specific operations on specific dates. Whenever a piece 16 is placed on a peg 12, cap 20 is rotated so that indicia 21 signifies the amount of time for that machine committed on the indicated date.

Thus, a person looking at my scheduler arranged as indicated above can determine the sequence of operations for any given job by following the pieces 16 of its specific color across the scheduler; the effect of rescheduling any given operation would be apparent immediately. By viewing the loading of any given machine or machines, as represented by the position of indicia 21 or the use of overtime colors on caps 20, bottlenecks can be anticipated and avoided. If the job shop is offered a rush job that it must perform immediately or else refuse, the effect of delaying the operations that would be replaced by the rush job would be readily apparent. Thus, optimum use can be made of the machines in the shop without the fear of failure to live up to prior commitments, and all of this is accomplished on a relatively inexpensive, durable device that can be easily understood and operated by workers having only average skills.

Although the form of my invention shown and described herein constitutes the preferred embodiment, it is not intended to illustrate herein all equivalent forms and ramifications thereof. Also, the words used are words of description rather than of limitation, and various changes may be made without departing from the spirit or scope of my invention.

What I claim as new and desire to secure by Letters Patent of the United States is:

1. A system for visibly scheduling operations to be performed by a plurality of work performing units during a predetermined future period of time comprising:
   (I) means visibly identifying work performing units, each comprising a row of elements;
   (II) means visibly identifying predetermined divisions of said period of time comprising columns of said elements;
   (III) means visibly identifying each job to be performed during said period of time comprising pieces of colored material, there being a plurality of colors, and each such color identifying a specific job;
   (IV) means visibly identifying each operation forming a part of such job; and
   (V) manually movable means visibly designating how much time of each work performing unit is committed during each of said divisions.

2. The invention defined in claim 1 wherein:
   (I) said means identifying each work performing unit comprises a plurality of protrusions aligned in horizontal rows, each such row identifying a specific work performing unit;
   (II) said time division identifying means comprises alignment of said protrusions in vertical rows, each such row identifying a specific time division;
   (III) said operation identifying means comprises a plurality of said pieces each supported by one of said protrusions, each of said protrusions passing through a perforation in each piece, each such piece on each such protrusions identifying a specific operation; and
   (IV) said committed time designating means comprises rotatable caps receiving and being supported by an end of each of said protrusions, there being indicia imprinted on each cap, and the position of such indicia designating how much time of a work performing unit is committed.

3. The invention defined in claim 2 wherein: each protrusion comprises a tapered peg having its large end attached to horizontally slidable panel means.

4. The invention defined in claim 2 further comprising: upper and lower horizontal channel means slidably receiving a plurality of generally equal-sized panels, said panels supporting said protrusions, and being removable from between said channel means and reinsertable therebetween.

5. The invention defined in claim 2 wherein: the perforation in each of said pieces is smaller than the larger end of said pegs, whereby each piece is spaced away from said panel.

6. The invention defined in claim 1 wherein: said means identifying work performing units comprises a plurality of protrusions aligned in horizontal rows, each such row identifying a specific work performing unit.

7. The invention defined in claim 6 wherein: said time division identifying means comprises alignment of said protrusions in vertical rows, each such row identifying a specific time division.

8. The invention defined in claim 6 wherein: said operation identifying means comprises a plurality of said pieces being supported by a plurality of said protrusions passing through a perforation in each piece, each such piece on each such protrusion identifying a specific operation.

9. The invention defined in claim 6 wherein: said committed time designating means comprises rotatable caps receiving and being supported by an end of said protrusions, there being indicia imprinted on each cap, and the position of such indicia designating how much time of a work performing unit is committed.

References Cited

UNITED STATES PATENTS

| | | | |
|---|---|---|---|
| 407,548 | 7/1889 | Odell et al. | 116—136 |
| 1,794,007 | 2/1931 | Fisher | 116—136 |
| 2,519,724 | 8/1950 | Whitaker | 116—136 |
| 2,544,445 | 3/1951 | Corzilius. | |
| 2,640,457 | 6/1953 | Scordo et al. | 116—136 |
| 3,290,797 | 12/1966 | Opel. | |
| 3,381,393 | 5/1968 | Burk | 116—136 X |

LOUIS R. PRINCE, Primary Examiner

D. M. YASICH, Assistant Examiner

U.S. Cl. X.R.

35—24